United States Patent [19]

Helliker et al.

[11] 4,225,346

[45] Sep. 30, 1980

[54] PROCESS FOR FABRICATING POROUS NICKEL BODIES

[75] Inventors: Conrad D. Helliker, Joplin, Mo.; Thomas D. O'Sullivan, Summit, N.J.

[73] Assignee: Bell Telephone Laboratories, Incorporated, Murray Hill, N.J.

[21] Appl. No.: 940,714

[22] Filed: Sep. 8, 1978

[51] Int. Cl.³ .......................... B22F 1/00; B22F 3/10
[52] U.S. Cl. ....................................... 75/211; 75/222
[58] Field of Search ................................. 75/211, 222

[56] References Cited

U.S. PATENT DOCUMENTS

| 3,796,565 | 3/1974 | Hancock et al. ...................... 75/222 |
| 3,839,026 | 10/1974 | Gibbon et al. ......................... 75/211 |
| 3,899,325 | 8/1975 | Harrison ............................... 75/211 |
| 4,113,480 | 9/1978 | Rivers .................................... 75/211 |

Primary Examiner—Brooks H. Hunt
Attorney, Agent, or Firm—Walter G. Nilsen

[57] ABSTRACT

A process is described for making porous nickel bodies of various shapes. The process is advantageous because it permits casting, molding or extruding into various shapes before sintering. Such porous nickel bodies are useful as plaques in various kinds of batteries as well as filters, sieves and inert bodies for holding catalysts. Porous nickel bodies might also be useful for promoting heterogeneous gaseous reactions (with or without catalysis) particularly for gaseous exchange reactions.

16 Claims, 3 Drawing Figures

PROCESS FOR FABRICATING POROUS NICKEL BODIES

TECHNICAL FIELD

The invention is a process for making porous nickel bodies.

BACKGROUND OF THE INVENTION

Porous nickel bodies are useful in a variety of applications including, for example, as plaques for alkaline batteries, as filters or seives and as inert structures for catalysts and absorption media. Although traditional methods for making porous nickel plaques yield perfectly good results, it is limited in versatility and often requires the use of organic solvents. Also, it is higly desirable to be able to vary the shape of a porous nickel body so as to optimize thickness and other shape factors for various applications. For example, with nickel plaques used in electrodes for alkaline batteries, greater thicknesses than presently used might be highly desirable. Such thicknesses are not conveniently obtainable by traditional methods. Also, for other applications such as electrical or magnetic applications various body shapes are often desirable. These body shapes are often different from those used in battery applications. Second, from an economic point of view, as well as an ecological point of view, it is desirable to eliminate organic solvents from processing procedures. Indeed, the use of water as a solvent instead of organic solvents is highly desirable.

SUMMARY OF THE INVENTION

The invention is a process for making porous nickel plaques. Powdered solid metal capable of withstanding sintering and comprising some nickel is mixed into an aqueous solution of cellulose derivative which, on heating, gells into a semi-solid body. After gelling, the body is sintered, generally at a temperature between 600 and 1200 degrees C in a reducing atmosphere. The solution contains an appropriate concentration of modified cellulose (preferably methyl cellulose) and the body shape is obtained by maintaining this solution in the desired shape while heating and gelling. This procedure is advantageous because porous nickel bodies of any shape can be made conveniently and organic solvents are not involved in the process.

DETAILED DESCRIPTION

Figure 1:
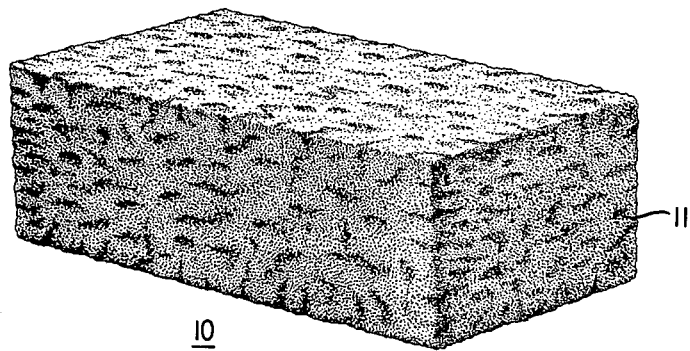
FIG. 1 shows a perspective view of a porous nickel body with an approximately rectangular shape.

The invention in its broadest terms is a process for making porous nickel plaques in which a cellulose derivative is used to make a gelled slurry prior to sintering. A variety of modified celluloses may be used provided they gel on heating. Typical examples of such celluloses are the cellulose ethers. Typical examples are as follows:

Alkyl celluloses such as ethyl and methyl celluloses; Carboxyalkyl celluloses such as carboxymethyl cellulose; Hydroxyalkyl celluloses such as hydroxyethyl cellulose; Aralkyl celluloses such as benzyl cellulose; $\beta$-Substituted alkyl celluloses such as cyanoethyl cellulose.

Various other celluloses may be used provided they gel on heating.

A typical procedure involves dispersing the binder (the cellulose ether) in hot water, preferably between 80 degrees C. and the boiling temperature of the solution. Then, this suspension is dissolved in cold water, preferably at a temperature between 20 degrees C. and the freezing temperature of the solution. This results in a solution. Preferably, mixing of components should be done gently so as to minimize entrapped air. The nickel powder is then mixed in with the binding solution and the slurry is molded to provide the desired shape. Molding may be carried out with a molding device, rollers, dies, extruding, etc. Gelling is accomplished by heating to a temperature of usually between 50 and 120 degrees C. This produces gelling of the binder solution into the shape desired. A gelling temperature of 50–70 degrees C. is preferred to minimize water loss. Concentration of cellulose may vary over large limits but 1–10 weight percent (provided solubility is sufficient) provides excellent results. A concentration of 2–4 weight percent is most preferred. Viscosity of the solution before gelling may be varied by choice of cellulose and concentration of the solution. Generally, a viscosity of 200–100,000 cps is preferred. The gel body may then be altered by cutting to another shape or taken as is and sintered. Sintering is carried out gnerally in the temperature range between 600 and 1200 degrees C. for times between one minute and three hours. Higher temperatures require less times and sintering times generally increase with the increased size of the sintered body. Preferred conditions are 900–1000 degrees C and 10–40 minutes. Sintering is carried out in a reducing atmosphere to prevent oxidation of the nickel. Typical reducing atmospheres are dry hydrogen, wet hydrogen, cracked ammonia, reformed natural gas, etc. Various kinds of nickel powder may be used. Particle sizes may vary over large limits but roughly 3 microns (average from 2.6 to 3.4 microns) give excellent results. Bulk density of the nickel powder is 0.45 to 0.90 gm/cc. Generally, porosity may be decreased by using particles of higher bulk density.

A typical example may be useful in illustrating the invention. A quantity of nine grams of methyl cellulose ether is added to 150 milliliters of hot water. It is generally preferable to accomplish this mixing by pouring the hot water onto the methyl cellulose ether. After suitable mixing this suspension is poured onto 150 milliliters of ice. On stirring, and possibly further cooling, the methyl cellulose ether should dissolve in the water. Next, 325 grams of nickel powder are added to the cellulose solution. This solution is stirred and heated to produce a gel. The shape of the gel may be used as is or cut into a particular shape which is desired after sintering. The gel is then sintered in a reducing atmosphere (in a hydrogen gaseous atmosphere) for 20 minutes at 900 degrees C. This procedure yields porosities above 90 percent.

The sintered porous nickel body is useful as a filter or sieve and any other application where high surface area is required. A particularly good example is the gaseous diffusion process including use for isotope separation. It is also useful as an absorbing medium and as a substrate for holding catalytic materials. It also has useful electrical properties and useful magnetic properties. For example, it might be useful in certain electrical machinery where reduced eddy currents are desirable.

This porous nickel structure may be used to hold small amounts of other substances so as to give it desirable properties. For example, it might be used to hold small amounts of catalytic material such as platinum for use in catalysis. For this reason, the invention will include the process for making porous nickel bodies which have up to 25 weight percent of other substances dispersed in the sintered body to augment certain properties.

The porous nickel structure is particularly useful as an inert body in the fabrication of electrodes for various electrochemical devices such as batteries and fuel cells. For may electrodes used in such devices it is necessary to provide a structural member to contain the active material used in the battery. A typical example is the cadmium electrode in nickel cadmium batteries and also the nickel electrode in nickel cadmium batteries. Such structures should be highly porous and conductive so as to facilitate discharge and charge of the batteries electrode. Nickel plaques have been extensively used for both nickel and cadmium electrodes as well as other battery electrodes. The porous nickel structure made in accordance with the invention is highly advantageous because it can be varied in thickness or produced in any desirable and advantageous shape. This permits the fabrication of high quality batteries at lower cost. Electrodes with nickel plaques which are typically approximately 100 mils thick permit fabrication of high energy density batteries with fewer separate electrodes and no minimum degradation in conductivity.

Figure 2:
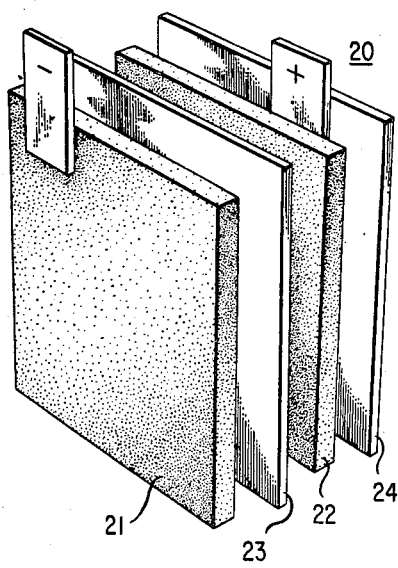
FIG. 2 shows, in perspective view, various coompo-nents of alkaline batteries including positive and negative electrodes made with porous nickel plaques in accordance with the invention.

FIG. 1 shows a typical body 10 of porous nickel body 11 made in accordance with the invention;

FIG. 2 shows several components of a typical alkaline battery 20, namely, a nickel cadmium battery. The negative electrode 21 is a cadmium electrode made by impregnating cadmium ions into a nickel porous plaque made in accordance with the invention. The positive electrode 22 is a nickel electrode also made by impregnating nickel ions into a nickel porous plaque made in accordance with the invention. Also shown are separators 23 and 24 used to electrically insulate the negative electrode from the positive electrode. Here the separators are made from micro-porous polymeric material. A multiplicity of such positive electrodes and negative electrodes may be assembled so as to make up a completed battery. The electrolyte in this particular battery is a 30 percent by weight KOH in water. In fabricating such a battery the individual electrodes are usually formed (electrolytically cycling the electrodes several times) and then assembled in the discharged condition. On charging the battery becomes ready for use.

Figure 3:
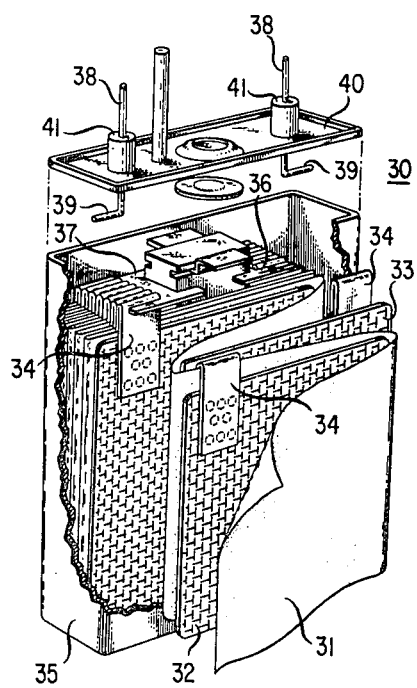
FIG. 3 shows, in perspective view partly in section, a nickel cadmium battery with multiple positive and negative electrodes made with porous nickel plaques in accordance with the invention.

A more detailed drawing of a battery is shown in FIG. 3. This figure shows a partially assembled sealed nickel cadmium battery 30. The battery is made up of a separator 31, and a negative electrode 32 which is impregnated with cadmium into a nickel plaque made in accordance with the invention. Also shown is a positive electrode 33 impregnated with nickel together with metal tabs 34 and outer battery container 35. The metal tabs are connected together by a core structure having negative 36 and positive 37 electrodes. An electrical connection is made to battery posts 38 by means of metal strip 39. The metal posts are connected to the cover plate 40 by means of a compression seal 41.

We claim:

1. A process for making porous nickel bodies by sintering a gel mixture characterized in that prior to sintering, the gel mixture is made by mixing together an aqueous solution of modified cellulose ether which gels on heating and a metal powder consisting essentially of nickel and heating this mixture to a temperature between 50 and 120 degrees C. in order to achieve gelling.

2. The process of claim 1 in which the sintering takes place in a reducing atmosphere and in the temperature range from 600-1200 degrees C. for a time between one minute and three hours.

3. The process of claim 1 in which the nickel powder has an average particle size between 2.6 and 3.4 microns.

4. The process of claim 1 in which the nickel powder has a bulk density between 0.45 and 0.90 grams/cc.

5. The process of claim 1 in which the modified cellulose ether is an alkyl cellulose.

6. The process of claim 5 in which the alkyl cellulose is selected from the group consisting of methyl and ethyl cellulose.

7. The process of claim 1 in which the modified cellulose ether is carboxyalkyl cellulose.

8. The process of claim 7 in which the carboxyalkyl cellulose is carboxymethyl cellulose.

9. The process of claim 1 in which the modified cellulose ether is hydroxyalkyl cellulose.

10. The process of claim 9 in which the modified cellulose ether is selected from the group consisting of hydroxymethyl cellulose and hydroxy ethyl cellulose.

11. The process of claim 1 in which the gelling temperature is between 50 and 70 degrees C.

12. The process of claim 11 in which the cellulose solution contains between one and ten weight percent modified cellulose ether.

13. The process of claim 12 in which the concentration range is from two to four weight percent.

14. The process of claim 1 in which the viscosity of the cellulose solution is between 200 and 100,000 cps.

15. The process of claim 1 in which the aqueous solution of modified cellulose ether is made by first dispersing the modified cellulose ether in hot water and then dissolving the resulting suspension in cold water.

16. The process of claim 15 in which the hot water has a temperature between 80 degrees C. and the boiling temperature of water and the cold water has a temperature between 20 degrees C. and the freezing temperature of water.

* * * * *